United States Patent
Mayuzumi

(10) Patent No.: US 7,621,259 B2
(45) Date of Patent: Nov. 24, 2009

(54) INTERNAL COMBUSTION ENGINE CONTROLLER

(75) Inventor: Takuya Mayuzumi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 244 days.

(21) Appl. No.: 11/869,447

(22) Filed: Oct. 9, 2007

(65) Prior Publication Data

US 2009/0183714 A1    Jul. 23, 2009

(30) Foreign Application Priority Data

Oct. 10, 2006 (JP) .............................. 2006-276364
Jul. 19, 2007 (JP) .............................. 2007-188659

(51) Int. Cl.
*F02M 51/00* (2006.01)
*H01H 47/32* (2006.01)

(52) U.S. Cl. ...................... 123/490; 361/155

(58) Field of Classification Search ................. 123/490; 251/129.15, 129.16; 361/152–156; 323/282, 323/283

See application file for complete search history.

(56) References Cited

U.S. PATENT DOCUMENTS

| | | | |
|---|---|---|---|
| 6,031,707 A * | 2/2000 | Meyer | 361/153 |
| 6,250,286 B1 * | 6/2001 | Hoenig et al. | 123/490 |
| 6,360,725 B1 * | 3/2002 | Scherrbacher | 123/490 |
| 6,384,512 B1 * | 5/2002 | Maeda | 310/316.03 |
| 6,526,945 B2 * | 3/2003 | Herzog et al. | 123/490 |
| 7,057,870 B2 * | 6/2006 | Meyer et al. | 361/139 |
| 7,199,502 B2 * | 4/2007 | Reggio | 310/317 |
| 7,546,830 B2 * | 6/2009 | Nagase et al. | 123/490 |
| 2008/0289607 A1 * | 11/2008 | Mayuzumi et al. | 123/490 |
| 2009/0015223 A1 * | 1/2009 | Kakehi | 323/282 |
| 2009/0107469 A1 * | 4/2009 | Takahashi et al. | 123/490 |

FOREIGN PATENT DOCUMENTS

| | | |
|---|---|---|
| JP | 2002-303185 A | 10/2002 |
| JP | 2003-319699 A | 11/2003 |
| JP | 2005337137 A * | 12/2005 |

* cited by examiner

*Primary Examiner*—Willis R Wolfe, Jr.
(74) *Attorney, Agent, or Firm*—Crowell & Moring LLP

(57) ABSTRACT

In a voltage boost circuit for driving a fuel injector of an internal combustion engine, a high voltage developed in the voltage boost coil will be discharged into the battery power supply through the boost coil by electrically energizing a discharge switching element provided in parallel to the charging diode. If the overboost compensation overlaps a boost execution period, the end of the boost execution period will await starting of the overboost compensation.

25 Claims, 11 Drawing Sheets

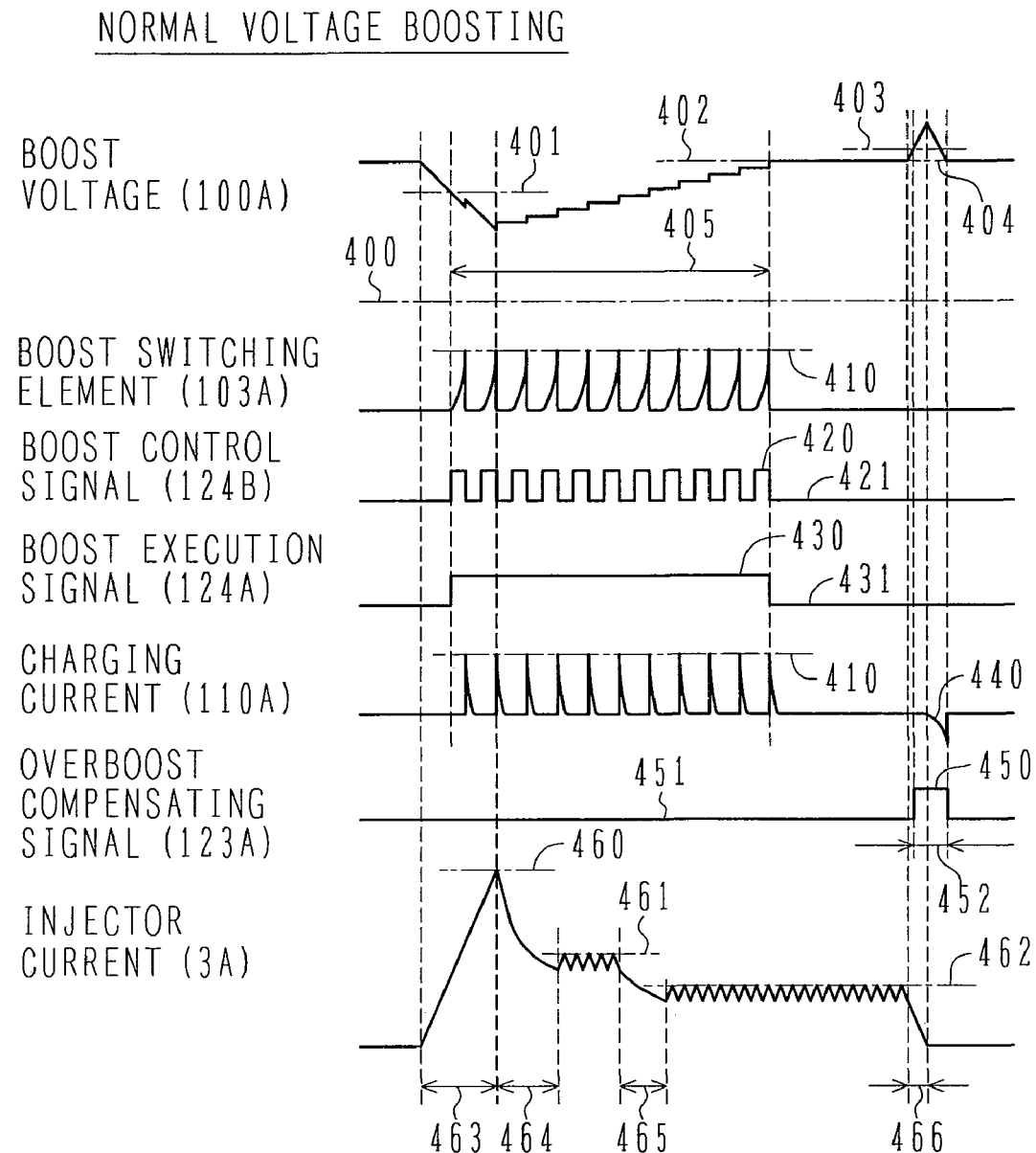

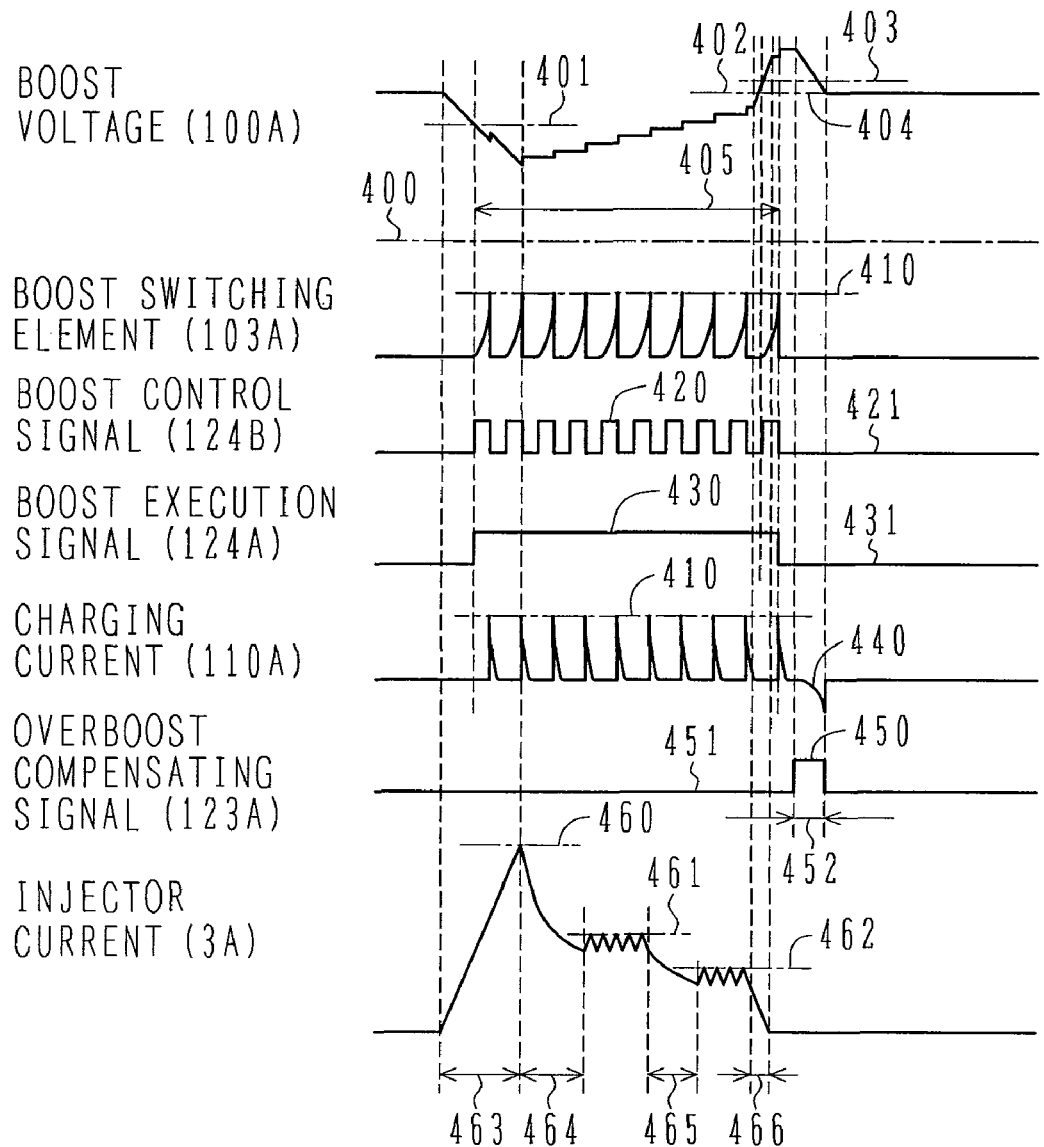

DEAD TIME ASSOCIATED WITH CURRENT REGENERATION DURING VOLTAGE BOOSTING

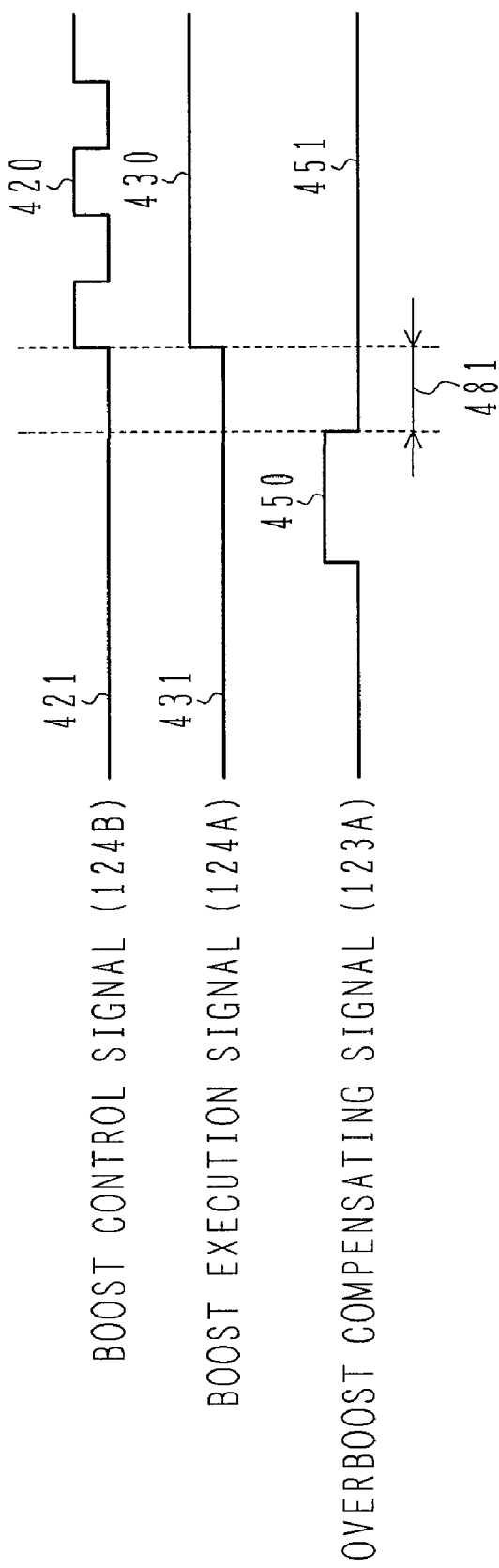

INTERNAL COMBUSTION ENGINE CONTROLLER

BACKGROUND OF THE INVENTION

1. Field of the Invention

The present invention relates generally to internal combustion engine controllers that drive loads using a high voltage obtained by boosting a battery voltage in an automobile, motorcycle, agricultural tractor, machine tool, marine engine, or other machines fueled with gasoline, a light oil, or the like. More particularly, the invention concerns an internal combustion engine controller suitable for driving an in-cylinder direct injection type of injector.

2. Description of the Related Art

Conventionally, in the automobiles, motorcycles, agricultural tractors, machine tools, marine engines, and other machines fueled with gasoline, light oil, or the like, injectors for injecting the fuel directly into cylinders are used to improve fuel efficiency and engine output. Such an injector is called the in-cylinder direct injection type of injector or simply called the direct injection (DI) type of injector. The engines employing the in-cylinder direct injection type of injector need to use a fuel that has been pressurized to a high pressure, so these engines require high energy for the valve-opening operation of the injector, compared with the gasoline engines of the currently prevailing scheme that create an air-fuel mixture and inject the mixture into a cylinder. In addition, the high energy must be supplied to the injector within a short time to improve controllability and generate higher engine speeds.

FIG. 9 shows an example of a conventional internal combustion engine controller designed to control the injector. The controller of the scheme shown in FIG. 9 has a voltage boost circuit 100 to boost a battery voltage 1 to a higher voltage and uses the thus-generated boost voltage 100A to enhance the signal level of the current supplied to the injector 3. Most of the conventional controllers for controlling the injector of an internal combustion engine employ this scheme.

The typical current signal waveform that the in-cylinder direct injection type of injector forms is the injector current signal waveform 3A shown at the bottom of FIG. 2. The injector uses a boost voltage 100A to raise the injector current signal 3A to a predetermined peak current deactivation level 460 within a short time during the initial phase of a peak current supply period 463. This peak current level is about 5 to 20 times as great as the injector current level achieved in the currently prevailing gasoline engine scheme for creating an air-fuel mixture and injecting the mixture into a cylinder.

After the foregoing peak current supply period 463, the source of energy supply to the injector 3 changes from the boost voltage 100A to the battery power supply first and then the hold current 1 controlled by a hold-1 deactivation current 461 of a level about ½ to ⅓ of the peak current level, and further changes to the hold current 2 controlled by a hold-2 deactivation current 462 of a level about ⅔ to ½ of that of the hold-1 deactivation current 461. The injector 3 uses the peak current and the hold current 1 to open the valve and inject the fuel into a cylinder.

It is necessary to cut off the injector supply current 3A by shortening a supply current fall period 466 thereof to close the valve of the injector more rapidly during the end of the injection. However, high energy is stored within the injector 3 because of the injector current 3A flowing therein, and to reduce the current level, it is necessary that the energy be made to disappear from the injector 3. Various schemes are adopted to achieve this within the short fall period 466 of the injector supply current 3A. In one scheme, the driving element of a driving circuit 200 for driving the injector current converts the energy into thermal energy using a Zener diode effect. In another scheme, a voltage boost capacitor 111 for storing the boost voltage 100A of the boost circuit 100 regenerates the injector current 3A through a current-regenerating diode 2.

The above scheme that converts the energy into thermal energy can be used to simplify the driving circuit 200 possible, but is not suitable for a driving circuit of a large current since the current supply energy of the injector 3 is converted into thermal energy. The scheme that utilizes the regeneration by the voltage boost capacitor, on the other hand, makes the occurrence of heat in the driving circuit 200 relatively suppressible, even when a large current is supplied to the injector 3. Therefore, the latter scheme is commonly used in the engines fueled with a light oil and employing the direct injection type of large-current injector (these engines may also be called "common-rail engines"), and in the gasoline-fueled engines employing the in-cylinder direct injection type of injector.

The boost voltage 100A is controlled according to the particular valve-opening characteristics of the injector 3 by a voltage boost control circuit 120 so as to stay within a previously set voltage range. However, if the injector current 3A is circulated into the voltage boost capacitor 111 of the boost circuit 100 through the current-regenerating diode 2, the boost voltage 100A is likely to overstep the previously set voltage range and enter an overboost state. If this actually happens, the valve-opening characteristics of the injector 3 will be adversely affected. In addition, if power supply short-circuiting or other trouble occurs in the injector, the boost voltage 100A is likely to exceed the withstand voltage of the driving element or voltage boost capacitor 111 of the boost circuit 100 and result in circuit damage. In order to avoid these risks, as described in JP-A-2002-303185, a charge overvoltage detection circuit is provided so that if a charging voltage becomes an overvoltage, the charging operation will be stopped. However, once an overboost state has actually occurred, this state cannot be compensated for, so the above conventional technique has caused the situation that the arrival of the next injector supply current at the peak current level thereof has adverse effects upon the valve-opening characteristics of the injector.

In addition, an example in which, as described in JP-A-2003-319699, a scheme intended to prevent the occurrence of voltage overboost with a regenerated current in an electric power-steering system using a boost voltage, by providing an n-channel type of MOSFET Q2 as a switching element in parallel to a diode D2 equivalent to a charging diode 110-1, and returning the regenerated current to a battery power supply, is introduced as an application of an apparatus other than an injector. The electric power-steering system is an apparatus that drives a motor, and in this apparatus, current regeneration continuously occurs during motor slowdown. Based on the recognition that current regenerative control is underway during this period, boost voltage control for returning the current to the battery power supply is continuously conducted and the boost voltage is not used for driving. In contrast to this, internal combustion engine controllers that drive an injector alternate between injector driving that uses a boost voltage, and current regeneration after supply of the injector current. Additionally, general internal combustion engines have two to eight cylinders or more cylinders, not one cylinder only, and engines of the direct injection scheme use one or more injectors for each cylinder.

For these reasons, in the internal combustion engine controllers of the direct injection scheme that each drive a plurality of injectors, decreases in boost voltage 100A due to driving of the injector current 3A that uses the boost voltage, and rises in the boost voltage due to the current regenerated by the injector current occur in alternate or complex patterns, not continuously. Under these changes in the boost voltage, it is important that the boost voltage be continuously controlled to stay within a previously set voltage range. If the foregoing current regeneration occurs during a voltage boost recovery period 406 that compensates for a decrease in the boost voltage, since the current regeneration can be used as the energy for voltage boost compensation, returning the regenerated current to the battery power supply will only turn out to be ineffective. Unlike electric power-steering systems, therefore, the internal combustion engine controllers for driving an injector(s) do not allow control in which whether the regenerated current is to be returned from the voltage boost circuit 100 to the battery power supply is determined, depending upon whether current regeneration occurs.

Non-Patent Reference 1: Kazuo Shimizu, "Design for Regulated Power Circuit—Continuation", issued in 1974 by the CQ Publishing Co., Ltd.

SUMMARY OF THE INVENTION

The present invention is intended to compensate for an overboost state of a voltage boost circuit in such a form as to suit particular driving conditions for an injector. The invention is also intended to prevent damage to the boost circuit if current regeneration occurs during execution of boosting and the overboost-compensating operation and the boost operation simultaneously occur to short-circuit a voltage boost capacitor and a power supply grounding element in the boost circuit.

In addition, in order to compensate for an overboost state, the invention is intended to provide an internal combustion engine controller having a voltage boost circuit, the controller being capable of minimizing the amount of heat occurring, the number of components to be added, and a noise level.

The present invention is constructed such that in a voltage boost circuit used to drive an injector, if regeneration of an injector current results in a boost voltage higher than an overboost compensation starting voltage, a high voltage developed in a voltage boost coil used for voltage boosting will be discharged into a battery power supply through the boost coil by electrically energizing a discharge switching element provided in parallel to a voltage boost diode which electrically energizes a capacitor. In addition, whether the overboost compensation is to be executed is judged by monitoring the boost voltage. If the overboost compensation overlaps a boost execution period, an end of the boost execution period will be awaited until the overboost compensation is started.

In order to solve the foregoing problems, an internal combustion engine controller of the present invention includes: a voltage boost circuit that supplies a switching current from a battery power supply voltage to a voltage boost coil and stores, into a voltage boost capacitor through a charging diode, a high voltage generated in the boost coil when a level of the switching current is reduced; a circuit that controls an injector current using the high voltage stored within the boost capacitor and makes the boost circuit regenerate electrical energy of an injector when a level of the injector current is reduced; and a discharge switching element provided in parallel to the charging diode; wherein, if the high voltage stored within the boost circuit exceeds a required overboost compensation starting voltage, the discharge switching element is electrically energized to discharge the high voltage into the battery power supply through the boost coil.

In another internal combustion engine controller of the present invention, after voltage boost switching, when a discharge switching element is electrically energized, a dead time that allows for a delay time required for a voltage boost switching element to cut off a current is provided and the discharge switching element is energized. In addition, after the electrical energizing of the discharge switching element, when the boost switching element is electrically energized for a shift to boosting, a dead time that allows for a delay time required for the discharge switching element to cut off a current is provided and the boost switching element is energized.

Yet another internal combustion engine controller of the present invention includes: a voltage boost circuit that supplies a switching current from a battery power supply voltage to a voltage boost coil and stores, into a voltage boost capacitor through a charging diode, a high voltage generated in the boost coil when a level of the switching current is reduced; a circuit that controls an injector current using the high voltage stored within the boost capacitor and makes the boost circuit regenerate electrical energy of an injector when a level of the injector current is reduced; and a discharge switching element provided in parallel to the charging diode; wherein, if the high voltage stored within the boost circuit exceeds a required overboost compensation starting voltage, when voltage boost switching is in progress, electrical energizing of the discharge switching element is suppressed; and wherein, after the voltage boost switching operation, the discharge switching element is energized to discharge the high voltage into the battery power supply through the boost coil.

Additionally, any one of the above internal combustion engine controllers of the present invention includes, in addition to the injector to be driven using the high voltage stored within the boost capacitor, a second load device that does not use the high voltage, and a circuit that makes the boost circuit regenerate electrical energy of the load device when a supply current level thereof is reduced.

Furthermore, any one of the above internal combustion engine controllers of the present invention includes, in addition to the above constituent elements, a control circuit equipped with an A/D converter for digitizing an analog voltage, with an arithmetic unit operating according to a program stored in a memory, and with an interface for generating an output of a driving signal between the arithmetic unit and a switching element; wherein software stored in the memory is used to apply a general-purpose control circuit to voltage boost control and overboost-compensating control.

Moreover, in addition to the above constituent elements, any one of the above internal combustion engine controllers of the present invention uses an FET as the discharge switching element; wherein a parasitic diode included in the FET operates as a substitute for the charging diode.

Besides, in addition to the above constituent elements, any one of the above internal combustion engine controllers of the present invention uses a bipolar transistor as the discharge switching element.

Besides, in addition to the above constituent elements, any one of the above internal combustion engine controllers of the present invention uses an IGBT as the discharge switching element.

The above means makes the present invention offer a significant effect in that when current is returned from the boost voltage to the battery power supply in order to compensate for an overboost state of the boost voltage, since this overboost state is compensated for to fit the driving conditions of the injector, thermal damage to the boost circuit due to current regeneration by the injector during the boost operation is prevented. In addition, the invention works very effectively in that the boost coil used for the boost operation can also be used for current regeneration, in that an increase in the number of components required is suppressed, and in that the noise that effects the battery power supply is also suppressed.

BRIEF DESCRIPTION OF THE DRAWINGS

FIG. 2 is a diagram showing an example of operating signal waveforms obtained under normal boost conditions in the first embodiment of the internal combustion engine controller according to the present invention;

FIG. 3A is a diagram showing an example of operating signal waveforms obtained by current regeneration during boosting in the first embodiment of the internal combustion engine controller according to the present invention;

FIG. 3C is a diagram showing an example of a dead time associated with supply of an injector peak current during overboost compensation in the first embodiment of the internal combustion engine controller according to the present invention;

DESCRIPTION OF THE PREFERRED EMBODIMENTS

Hereunder, first to fifth embodiments of the present invention will be described in order.

First Embodiment

Figure 1:
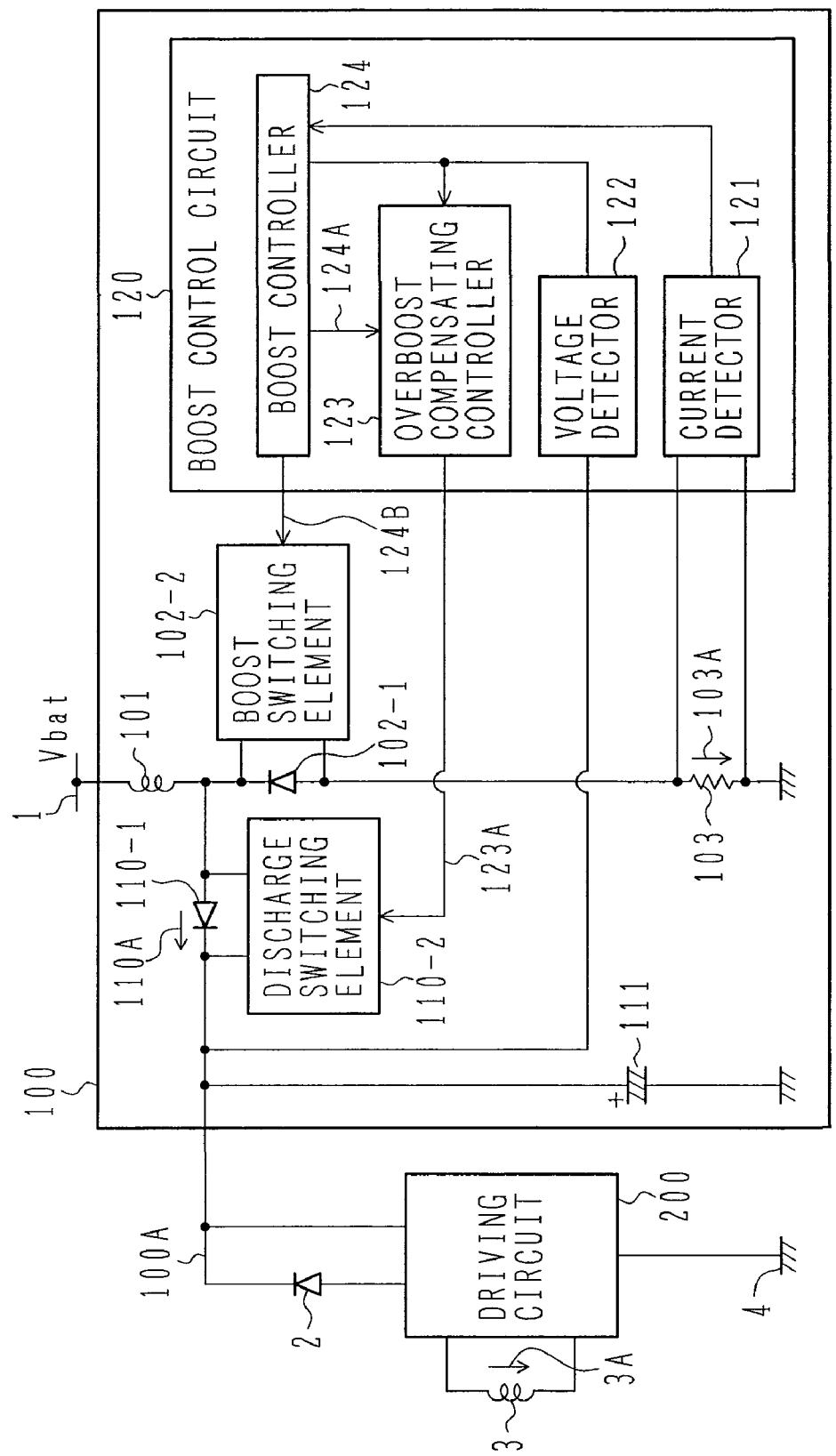
FIG. 1 is a diagram showing a first embodiment of an internal combustion engine controller according to the present invention.

FIG. 1 shows a configuration of the first embodiment of an internal combustion engine controller according to the present invention. FIG. 2 shows an example of operating signal waveforms obtained under normal boost conditions in the first embodiment.

As shown in FIG. 1, the internal combustion engine controller according to the first embodiment includes a voltage boost circuit 100 powered from a battery power supply 1 via a power-grounding element 4 thereof, and a driving circuit 200 for driving an injector 3 by using a boost voltage 100A that has been increased to a high voltage by the boost circuit 100. The internal combustion engine controller also has a current-regenerating diode 2 to return a regenerated current of the injector 3 to the boost circuit 100 and make the boost circuit regenerate a new current. In addition, the internal combustion engine controller may have: input circuits for various sensors including an engine speed sensor; an arithmetic unit for computing supply timing of the injector current in response to input signals from each input circuit; driving circuits such as an ignition coil driver and a throttle driver; a circuit for communication with an external controller; a control circuit with diagnostic functions and a fail-safe capability; a power supply circuit for supplying electric power to the above circuits.

In addition to a boost coil 101 with an inductance component for boosting a voltage of the battery power supply 1, the boost circuit 100 has: a boost switching element 102-2 for electrically energizing a supply current to the boost coil and off; a switching diode 102-1 for protecting the boost switching element from minus surge currents; a boost-switching current detection resistor 103 for converting into voltage form a boost switching current 103A that flows from the boost coil to the boost switching element; a charging diode 110-1 with a route for charging a high voltage that the energy stored within the boost coil is generated into a boost capacitor 111 by electrically de-energizing the boost switching element, the charging diode also preventing a reverse flow of current from the boost capacitor 111 to the battery power supply 1; a discharge switching element 110-2 for electrically activating and deactivating the reverse current (if developed); and a voltage boost control circuit 120, which includes a boost controller 124, an overboost-compensating controller 123, a voltage detector 122, and a current detector 121.

For normal boost operation, the driving circuit 200 uses the boost voltage 100A to supply the injector current 3A to the injector 3, and as a result, when the voltage detector 122 detects that the boost voltage 100A has decreased below a boost-starting voltage 401, the boost controller 124 starts the boost operation. After starting the boost operation, the boost controller 124 changes a level of a boost control signal 124B for electrically energizing the boost switching element 102-2, from LOW to HIGH. Thus, current is supplied from the battery power supply 1 to the boost coil 101 and energy is stored into the coil. The current that flows into the boost coil is converted into a voltage by the boost-switching current detection resistor 103 as the boost switching current 103A, and detected by the current detector 121.

As shown in FIG. 2, when the boost switching current 103A exceeds a required level of a switching deactivation current 410, the boost controller 124 cuts off the boost switching current by changing the level of the boost control signal 124B which controls an on/off state of the boost switching element 102-2, from HIGH to LOW. The current flowing through the boost coil 101, therefore, cannot flow into the power-grounding element through the boost switching element 102-2, and the energy stored within the boost coil 101 by the presence of its inductance component generates a high voltage. When this voltage increases above a voltage obtained by adding the boost voltage 100A within the boost capacitor 111 and a forward voltage of the charging diode 110-1, the energy stored within the boost coil 101 moves as a charging current 110A to the boost capacitor 111 through the charging diode 110-1.

At this time, the charging current 110A initially works as the switching deactivation current 410 that was flowing through the coil immediately before electrical cutoff of the boost switching element 102-2, and as the movement of the energy to the boost capacitor 111 progresses, a level of the charging current 110A decreases rapidly. If the voltage detector 122 for detecting the boost voltage 100A detects that the boost voltage 100A whose level has been increased by the above operation is less than a required boost-stopping voltage 402, the boost controller 124 usually changes the level of the boost control signal 124B from LOW to HIGH in order to energize the boost switching element 102-2 for a predetermined charging period or at a predetermined switching frequency, without detecting the charging current 110A. The above change of the signal level is repeated until the boost voltage has become equal to the required boost-stopping voltage 402.

Figure 3B:
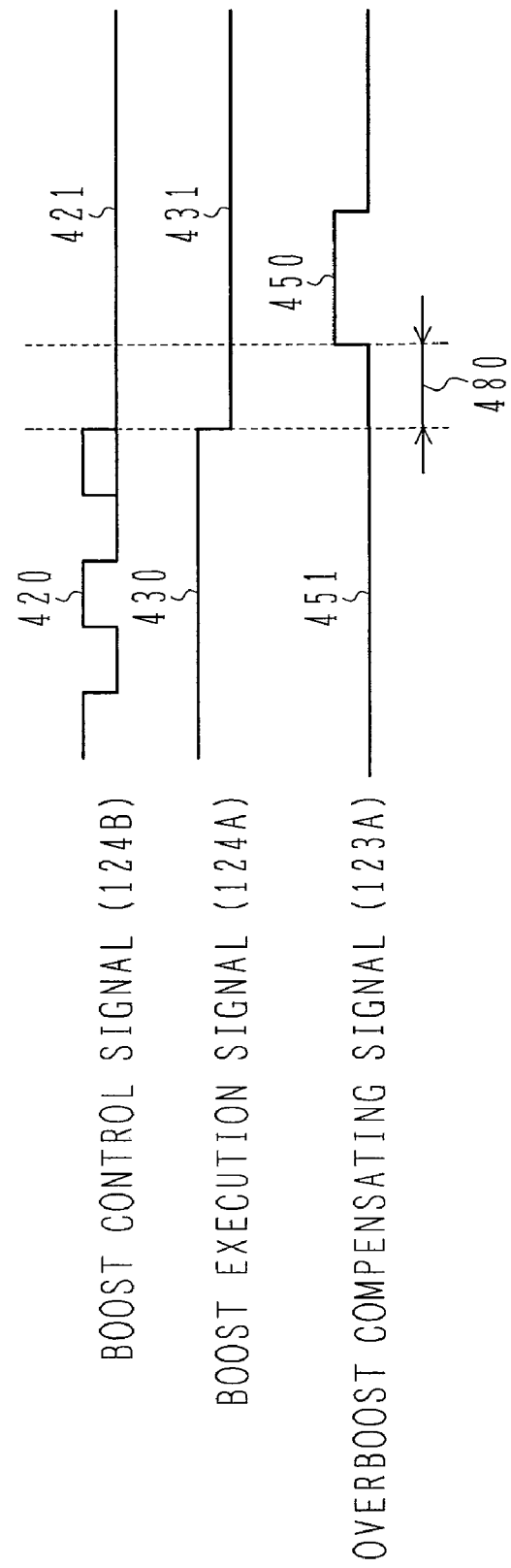
FIG. 3B is a diagram showing an example of a dead time associated with regeneration of a current during boosting in the first embodiment of the internal combustion engine controller according to the present invention.

Meanwhile, when cutoff of the injector current 3A by the driving circuit 200 begins, the current that has been regenerated by the injector 3 flows into the boost capacitor 111 through the current-regenerating diode 2 for the supply current fall period 466 shown in FIG. 2. Consequently, the energy stored within the boost coil 101 by the presence of the inductance component moves to the boost capacitor 111, as in the above boost operation, and this movement raises the boost voltage 100A stored in the boost capacitor 111. Next when the voltage detector 122 detects that the boost voltage has exceeded a required overboost compensation starting voltage 403, the overboost-compensating controller 123 confirms that a level of a boost execution signal 124A that the boost controller 124 outputs is LOW, that is, that the boost operation is not underway. In addition, as shown in FIG. 3B, the overboost-compensating controller 123 confirms that a discharging dead time 480 that allows for a characteristic delay time of the boost switching element 102-2, required for electrical cutoff of the boost switching element when the boost operation is completed and the discharge switching element 110-2 is energized, has passed, and changes a level of an overboost-compensating signal 123A from LOW to HIGH to prevent short-circuiting between the boost capacitor and the power-grounding element. Thus, the discharge switching element 110-2 connected in parallel to the charging diode 110-1 is energized and excess energy is safely returned from the boost capacitor through the boost coil 101 to the battery power supply 1 as a discharge current 440, a reverse current with respect to the charging current 110A. Until the voltage detector 122 detects that the boost voltage has decreased below the required overboost compensation stopping voltage, or confirms that a predetermined overboost-compensating period 452 has passed, the overboost-compensating controller changes the level of the overboost-compensating signal 123A from HIGH to LOW, thus de-energizing the discharge switching element 110-2, and completing the overboost compensation.

If, during the overboost compensation, the supply period 463 of the peak current to the injector 3 occurs and the boost voltage 100A decreases below the boost-starting voltage 401, the overboost compensation changes over to the boost operation. As shown in FIG. 3C, however, prior to the changeover, the overboost-compensating controller 123 confirms that a boost dead time 481 that allows for a characteristic delay time of the discharge switching element 110-2, required for electrical cutoff of the discharge switching element when the overboost compensation is completed and the boost switching element 102-2 is energized, has passed, and changes the level of the boost execution signal 124A from LOW to HIGH to prevent short-circuiting between the boost capacitor and the power-grounding element.

If a boost circuit 100 of a general injector driver requiring the boost voltage 100A uses NchFET as the boost switching element 102-2, the discharging dead time 480 that allows for the characteristic delay time of the boost switching element 102-2 preferably ranges from about 1 to 10 μs. Also, if the boost circuit 100 of the general injector driver requiring the boost voltage 100A uses PchFET as the discharge switching element 110-2, the boost dead time 481 that allows for the characteristic delay time of the discharge switching element 110-2 preferably ranges from about 1 to 50 μs.

Next, an example of operating signal waveforms obtained by current regeneration during boosting is shown in FIG. 3A.

When the voltage detector 122 detects that current regeneration has occurred during boosting and the boost voltage 100A has exceeded the required overboost compensation starting voltage 403, the overboost-compensating controller 123 detects, from the boost execution signal 124A output from the boost controller 124, that the boost operation is in progress, and suspends the execution of the overboost compensation.

When the voltage detector 122 detects that the boost voltage 100A has exceeded the required boost-stopping voltage 402, the boost controller 124 confirms that the level of the boost control signal 124B is LOW, maintains the LOW level, and stops the boost operation, as shown in FIG. 3A. In addition, the boost controller 124 switches the boost execution signal 124A from HIGH to LOW. This makes the overboost-compensating controller 123 execute the suspended overboost compensation. A method of executing the suspended overboost compensation is the same as for the above.

The overboost compensation, however, is not executed if the voltage detector 122 does not detect that current regeneration has occurred during boosting and the boost voltage 100A has exceeded the required overboost compensation starting voltage 403. In such a case, as in the conventional boost circuit, the energy stored in the boost capacitor 111 by the regeneration of the current from the injector 3 is used as auxiliary energy for the boost operation, and a voltage boost recovery period 405 can therefore be shortened.

In the above first embodiment, even during a fall period 464 of the peak current and a fall period 465 of the hold current 1, the boost circuit is made to regenerate a current, as in a fall period 466 of the supply current. In addition, if the boost voltage 100A stored within the boost capacitor 111 exceeds the required overboost compensation starting voltage 403, the boost voltage can be lowered to the overboost compensation stopping voltage 404 by returning the current from the boost capacitor through the boost coil 101 to the battery power supply.

Second Embodiment

Figure 4:
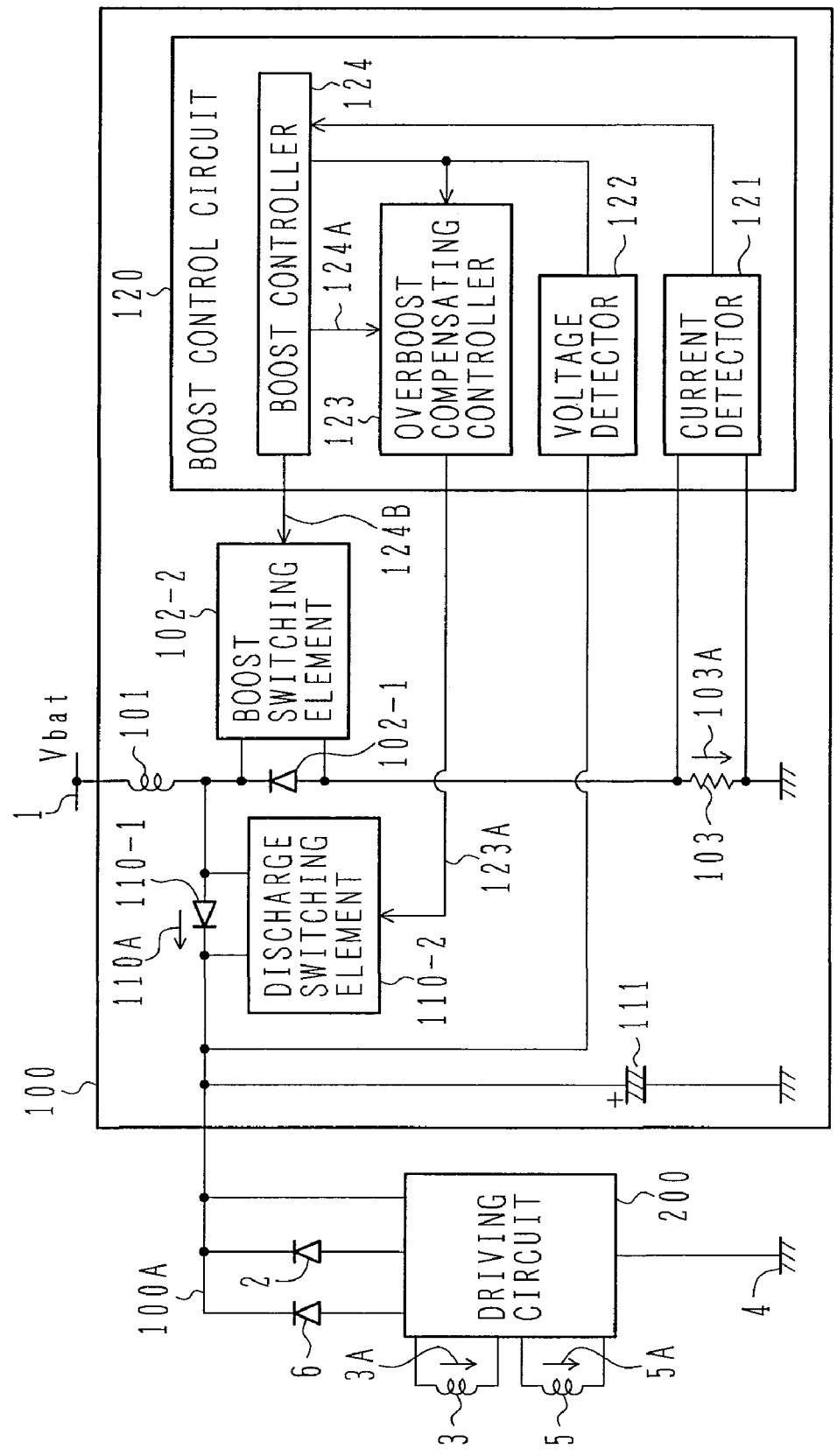
FIG. 4 is a diagram showing a second embodiment of an internal combustion engine controller according to the present invention.
Figure 5:
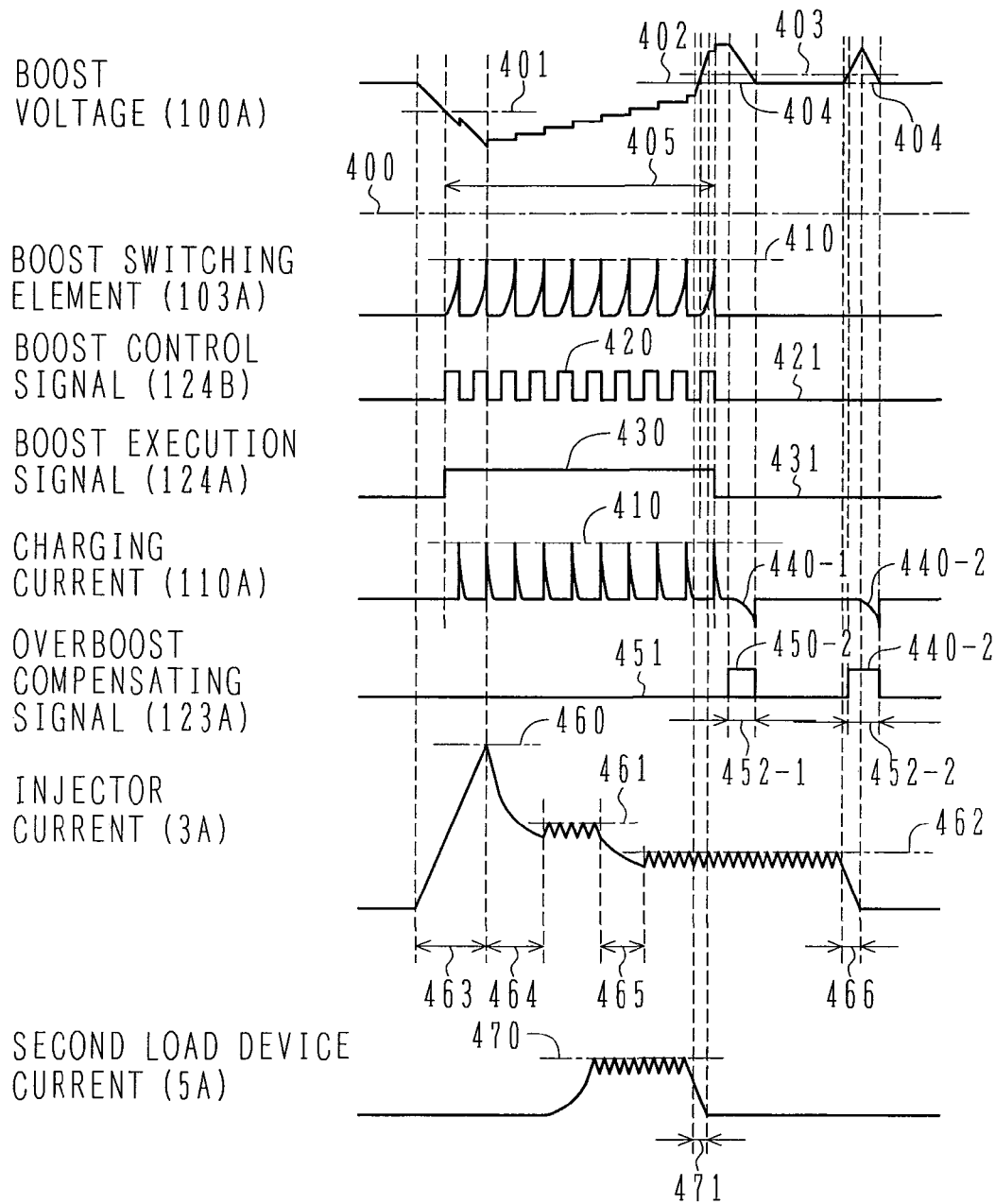
FIG. 5 is a diagram showing an example of operating signal waveforms obtained under normal boost conditions in the second embodiment of the internal combustion engine controller according to the present invention.

FIG. 4 shows a configuration of the second embodiment of an internal combustion engine controller according to the present invention. FIG. 5 shows an example of operating signal waveforms obtained under normal boost conditions in the second embodiment.

As shown in FIG. 4, the internal combustion engine controller according to the second embodiment differs from the engine controller of the first embodiment in that a driving circuit 200 drives a second load device 5 different from the injector 3. However, as with the current regeneration by the injector 3, described in the first embodiment, a current regenerated by the second load device 5 is supplied to the injector-driving boost circuit 100 for regeneration, through the current-regenerating diode 6. The second load device 5, as with the injector 3, is driven using an inductance component, and examples of the second load device are described below. More specifically, the kind of second load device is not limited and the engine controller can use an arbitrary device such as a fuel pump, provided that the device only needs to perform one current-regenerating operation upon the boost circuit 100.

The boost circuit 100 can execute overboost compensation only by judging from the boost voltage 100A and the boost execution signal 124A, so the boost circuit, even if originally designed to drive the injector 3, can accept the regeneration of current from the second load device 5 other than the injector, without a change to the circuit composition. In the driving circuit that drives the second load device, when a current that has been controlled by a hold current deactivation current 470 is deactivated rapidly during a supply current fall period 471 by a second load device current 5A in FIG. 5, it is possible to easily suppress the occurrence of heat in the driving circuit for driving the second load device, associated with the deactivation of the supply current. In addition, the boost recovery period 405 of the boost circuit can be shortened.

The circuit composition of the boost circuit is the same as in the first embodiment, so the operation of the boost circuit is also the same. Boost operation for current regeneration by the two kinds of loads shown in FIGS. 4 and 5 is described below. During the boost operation due to supply of current to the injector 3, when the current regeneration by the second load device 5 occurs, the voltage detector 122 detects that the boost voltage 100A has exceeded the required overboost compensation starting voltage 403, the overboost-compensating controller 123 detects that it is in the boost recovery period 405. The detection is based on the boost execution signal 124A that the boost controller 124 outputs. After the detection, the overboost-compensating controller 123 suspends execution of the overboost compensation.

When the voltage detector 122 detects that the boost voltage 100A has exceeded the required boost-stopping voltage 402, the boost controller 124 confirms that the level of the boost control signal 124B is LOW, and stops the boost operation, as shown in FIG. 5. In addition, the boost controller 124 confirms that the discharging dead time 480 that allows for the characteristic delay time of the boost switching element 102-2, required for electrical cutoff of the boost switching element when the boost operation is completed and the discharge switching element 110-2 is energized, has passed, and switches the boost execution signal 124A from HIGH to LOW. This makes the overboost-compensating controller 123 execute the suspended overboost compensation.

If, during the overboost compensation, the supply period 463 of the peak current to the injector 3 occurs and the boost voltage 100A decreases below the boost-starting voltage 401, the overboost compensation changes over to the boost operation. Prior to the changeover, however, the overboost-compensating controller 123 confirms that the boost dead time 481 that allows for the characteristic delay time of the discharge switching element 110-2, required for electrical cutoff of the discharge switching element when the overboost compensation is completed and the boost switching element 102-2 is energized, has passed, and changes the level of the boost execution signal 124A from LOW to HIGH to prevent short-circuiting between the boost capacitor and the power-grounding element.

A method of executing the suspended overboost compensation is the same as in the first embodiment. Conversely, if the voltage detector 122 does not detect that current regeneration has occurred during boosting and the boost voltage 100A has exceeded the required overboost compensation starting voltage 403, the overboost compensation is not executed and as in the conventional boost circuit, the energy stored in the boost capacitor 111 by the regeneration of the current from the second load device 5 is used as auxiliary energy for the boost operation. The voltage boost recovery period 405 can therefore be shortened.

After de-energizing the original injector 3 rapidly during the supply current fall period 466 and detecting that the boost voltage 100A has exceeded the required overboost compensation starting voltage 403 by the voltage detector 122, the overboost-compensating controller 123 confirms that the level of the boost execution signal 124A output from the boost controller 124 is LOW and that the boost operation is not in progress, and changes the level of the overboost-compensating signal 123A from LOW to HIGH to prevent short-circuiting between the boost capacitor and the power-grounding element. Thus, the discharge switching element 110-2 connected in parallel to the charging diode 110-1 is energized and excess energy can be safely returned from the boost capacitor through the boost coil 101 to the battery power supply 1 as the discharge current 440, a reverse current with respect to the charging current 110A.

After the voltage detector 122 has detected that the boost voltage 100A has decreased below the required overboost compensation stopping voltage 404, or after the predetermined overboost-compensating period 452 has passed, the overboost-compensating controller 123 changes the level of the overboost-compensating signal 123A from HIGH to LOW, thus de-energizing the discharge switching element 110-2, and completing the series of overboost-compensating processes.

Conversely, if the voltage detector 122 does not detect that current regeneration has occurred during boosting and the boost voltage has exceeded the required overboost compensation starting voltage 403, the overboost compensation is not executed and as in the conventional boost circuit, the energy stored in the boost capacitor 111 by the regeneration of the current from the injector 3 is used as auxiliary energy for the boost operation. The voltage boost recovery period 405 can therefore be shortened.

In the above second embodiment, even during the fall period 464 of the peak current and the fall period 465 of the hold current 1, the boost circuit is made to regenerate a current, as in the fall period 466 of the supply current. In addition, if the boost voltage 100A stored within the boost capacitor 111 exceeds the required overboost compensation starting voltage 403, the boost voltage can be lowered to the overboost compensation stopping voltage 404 by returning the current from the boost capacitor through the boost coil 101 to the battery power supply.

Third Embodiment

Figure 6:
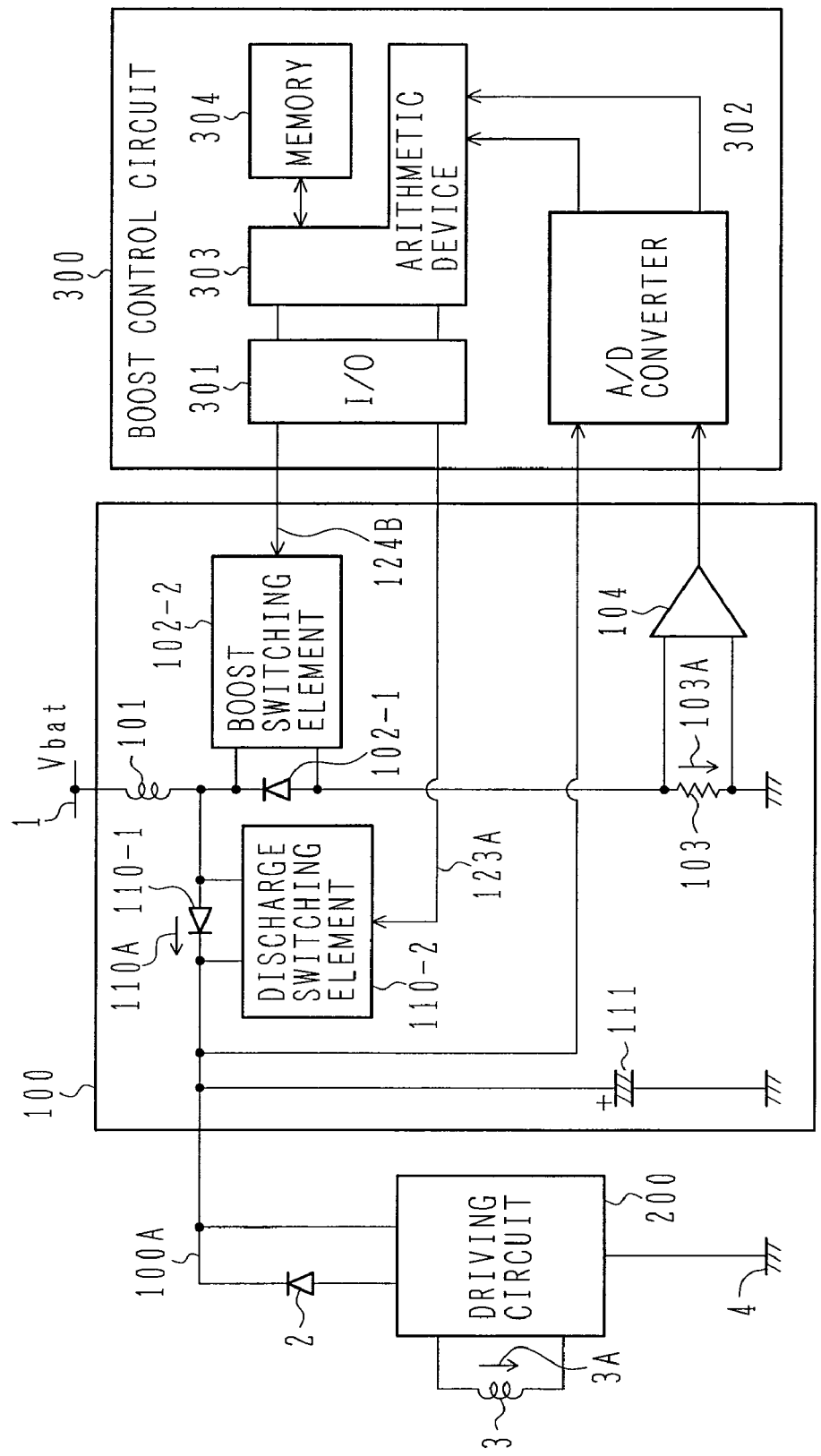
FIG. 6 is a diagram showing a third embodiment of an internal combustion engine controller according to the present invention.

FIG. 6 shows a configuration of the third embodiment of an internal combustion engine controller according to the present invention.

In the third embodiment, a control circuit 300 replaces the boost control circuit 120 used in the first or second embodiment. A case in which the boost control circuit in the first embodiment is replaced will be described below.

The control circuit 300 in the third embodiment is composed so that an arithmetic unit 303 operates in accordance with software stored in a memory 304, and so that even without special hardware, using a general-purpose microcomputer or the like makes it possible to implement a function equivalent to that of the boost control circuit 120 used in the first embodiment.

In addition to the memory 304 and the arithmetic unit 303, the control circuit 300 has an A/D converter 302 to convert voltages into digital signals, instead of the boost voltage detector and boost-switching current detector in the first embodiment. The control circuit 300 inputs directly the digital signals to the A/D converter 302 or indirectly via an amplifier 104 or the like. Based on results that have been computed by the arithmetic unit 303 using the input signals, the boost control signal 124B and overboost-compensating signal 123A for controlling the boost switching element 102-2 and the discharge switching element 110-2, respectively, are output from the A/D converter 302 through an interface.

The above third embodiment is the same as the first embodiment in that even during the fall period 464 of the peak current and the fall period 465 of the hold current 1, the boost circuit is made to regenerate a current, as in the fall period 466 of the supply current. The third embodiment is also the same as the first embodiment in that if the boost voltage 100A stored within the boost capacitor 111 exceeds the required overboost compensation starting voltage 403, the boost voltage can be lowered to the overboost compensation stopping voltage 404 by returning the current from the boost capacitor through the boost coil 101 to the battery power supply.

Fourth Embodiment

Figure 7:
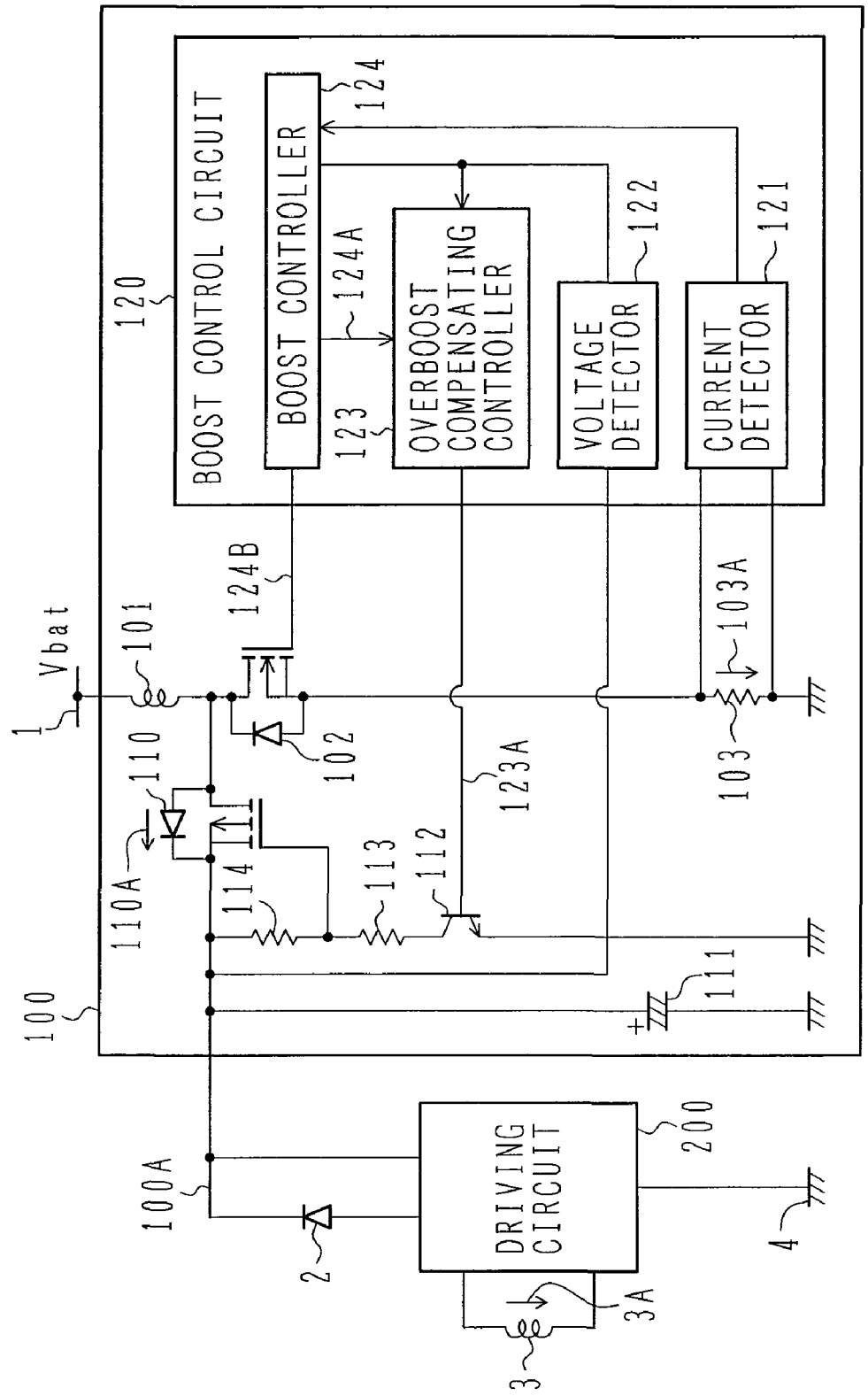
FIG. 7 is a diagram showing a fourth embodiment of an internal combustion engine controller according to the present invention.

FIG. 7 shows a configuration of the fourth embodiment of an internal combustion engine controller according to the present invention.

In the fourth embodiment, the discharge switching element 110-2 in any one of the first to third embodiments is substituted by an FET. In addition, since the FET has, as one of its characteristic properties, a parasitic diode between a drain and a source, using this parasitic diode as an alternative for the charging diode 110-1 included in any one of the first to third embodiments makes circuit simplification possible by integrating the discharge switching element and the charging diode into one charging FET 110.

Hereunder, an example of using a general PchFET as the charging FET 110 in place of the discharge switching element 110-2 in the first embodiment will be described using FIG. 7.

Specific features of the fourth embodiment are that a discharge FET gate drive transistor 112 is used to reverse a state of the overboost-compensating signal 123A output from the overboost-compensating controller 123 of the boost control circuit 120, and that an reversal signal 123B, which is a reversal signal of the overboost-compensating signal 123A and is obtained by voltage division by means of two discharge FET gate pull-up resistors 113 and 114, is used to control the charging FET 110. The above means that a general gate drive circuit uses PchFET as the charging FET 110, and that the drive circuit drives a PchFET gate voltage with a simple circuit composition. Such a gate drive circuit can also be incorporated into the overboost-compensating controller 123 of the boost control circuit. In a specific circuit composition, NchFET can be used as another alternative FET for the discharge switching element, and depending on actual needs and on costs, whether PchFET or NchFET is to be used is determined.

In the fourth embodiment, the switching diode 102-1 and boost switching element 102-2 in any one of the first to third embodiments are integratedly substituted by a boost switching element 102, in which case, because of downstream driving, NchFET is generally used in terms of characteristics, costs, and more.

In addition, similarly to the above, substituting the discharge switching element 110-2 and the boost switching element 102-2 for a bipolar transistor or an IGBT (Insulated Gate Bipolar Transistor) or the like, makes it possible to conduct variable control of a supply current by utilizing respective characteristics, and to use the boost circuit 100 to obtain a high voltage that a normal FET cannot withstand.

The above fourth embodiment is the same as the first embodiment in that even during the fall period 464 of the peak current and the fall period 465 of the hold current 1, the boost circuit is made to regenerate a current, as in the fall period 466 of the supply current. The fourth embodiment is also the same as the first embodiment in that if the boost voltage 100A stored within the boost capacitor 111 exceeds the required overboost compensation starting voltage 403, the boost voltage can be lowered to the overboost compensation stopping voltage 404 by returning the current from the boost capacitor through the boost coil 101 to the battery power supply.

Fifth Embodiment

Figure 8:
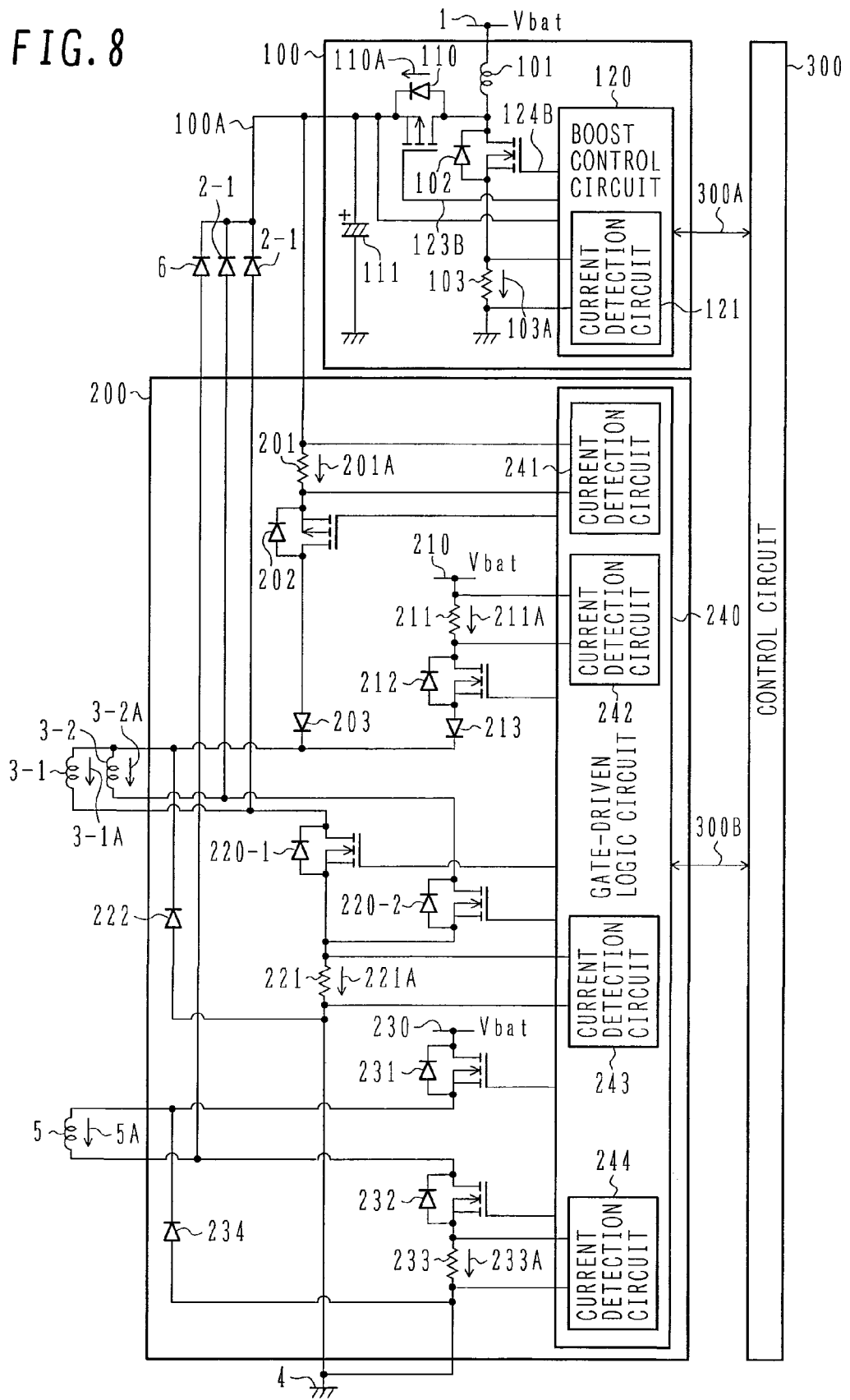
FIG. 8 is a diagram showing a fifth embodiment of an internal combustion engine controller according to the present invention.
Figure 9:
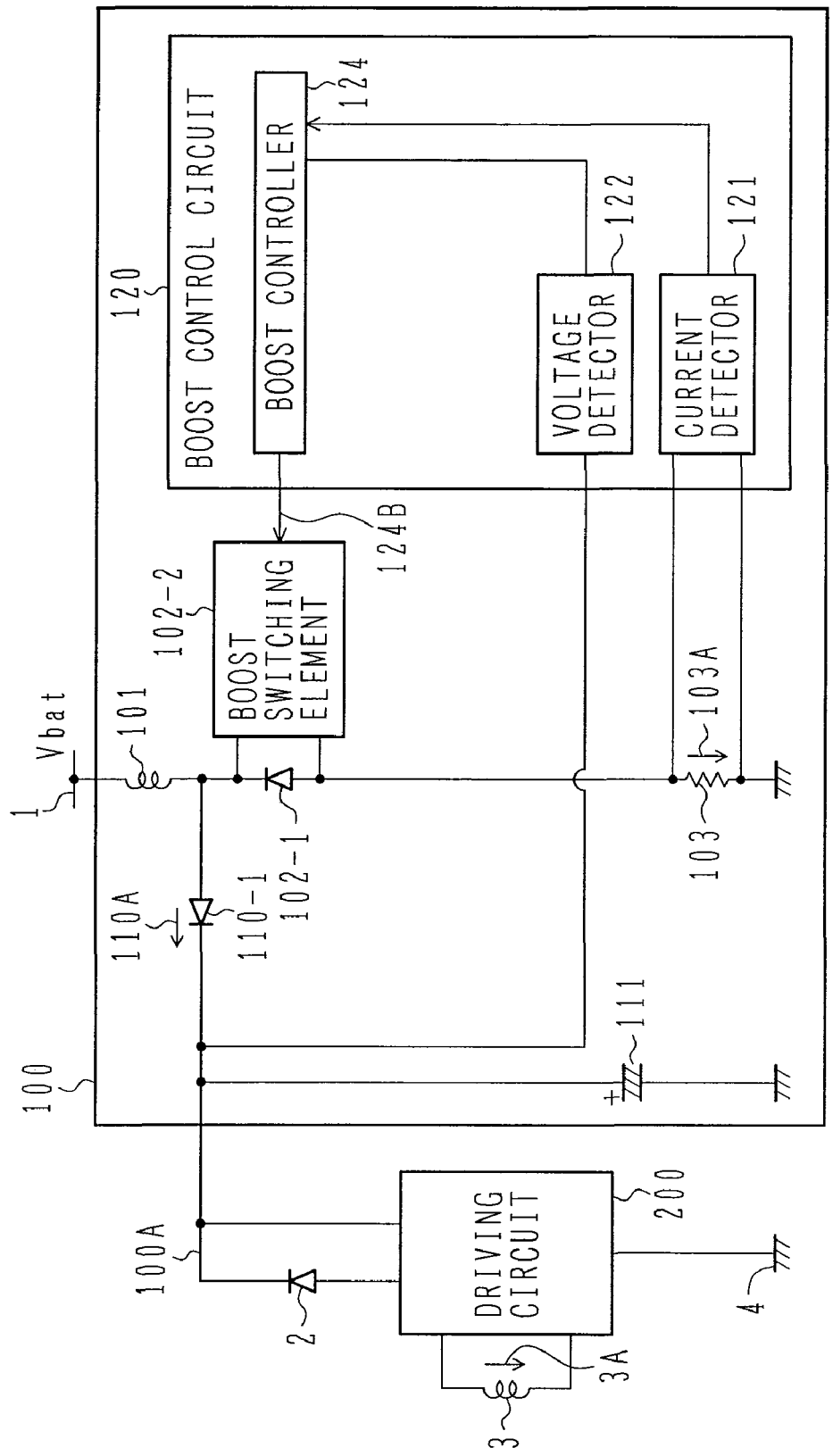
FIG. 9 is a diagram showing an example of a conventional internal combustion engine controller.

FIG. 8 shows a configuration of the fifth embodiment of an internal combustion engine controller according to the present invention.

The fifth embodiment is an example in which the boost circuit 100 used in the FET of the fourth embodiment is applied to a driving circuit 200 that drives a plurality of injectors, 3-1 and 3-2, and a second load device 5.

In the direct injection type of injector system that uses the boost voltage 100A obtained by boosting the battery voltage 1, the driving circuit 200 is commonly shared between at least two injectors, 3-1 and 3-2. Actual one internal combustion engine controller is applied to an engine having four to eight cylinders. However, one driving circuit 200 can drive a plurality of injectors, and FIG. 8 shows a case in which one driving circuit is applied to two injectors. The boost circuit 100 is shared between a further plurality of driving circuits 200, and one engine usually has one or two boost circuits. The number of driving circuits sharing one boost circuit is determined by factors such as: the energy required for driving during the peak current supply period 463 of the injector current 3A in FIG. 2; a maximum engine speed; the boost recovery period 405 determined by, for example, the number of fuel injections from the injector 3 for one combustion cycle in one cylinder; and self-generation of heat in the boost circuit 100.

The boost circuit 100 can be constructed to operate independently, as with the boost circuits in the first to fourth embodiments. In addition, separating the control circuit 300 and the boost circuit 100 from each other to conduct communications using a boost circuit-control circuit signal 300A renders a boost voltage variably controllable from the control circuit 300. Furthermore, the above makes it possible to implement more comfortable, safer operation of a system designed, for example, to drive a vehicle to a repair service agent or representative, by returning boost circuit self-diagnostic results to the control circuit and selecting a driving method that does not require a boost power supply.

A flow route of the boost voltage 100A that has been boosted by the boost circuit 100 is connected to an upstream side of each injector 3-1, 3-2, via a boost current detection resistor 201 for converting an overcurrent of an outflow current from the boost circuit 100 or a boost-side driving current 201A generated to detect harness disconnections or other states of the injector 3-1, 3-2, via a boost-side driving FET 202 for driving during the peak current supply period 463 of the injector current 3A in FIG. 2, and via a boost-side protection diode 203 for preventing a reverse current arising from a fault in the boost circuit 100.

A battery current detection resistor 211, a battery-side driving FET 212, and a battery protection diode 213 are connected in that order at the upstream side of the injector 3-1, 3-2. The battery current detection resistor 211 converts a battery drive current 211A into a voltage in order to detect the overcurrent from a battery power supply 210 or the harness disconnections or other states of the injector 3-1, 3-2. The battery-side driving FET 212 drives the hold-1 deactivation current 461 and hold-2 deactivation current 462 of the injector current 3A, shown in FIG. 2. The battery protection diode 213 prevents current from flowing in reverse from the flow route of the boost voltage 100A into the battery power supply 210.

A downstream driving FET is connected to each of the plural injectors 3-1, 3-2. The injector 3-1, 3-2 energized is determined by a switching operation of the downstream driving FET 1 (220-1) or the downstream driving FET 2 (220-2), and injector currents 3-1A, 3-2A that flow into each injector are converged at a further downstream position with respect to the downstream driving FET, and then flow into the power-grounding element 4 via a downstream current detection resistor 221 that converts current into voltage.

Also, a reflux diode 222 is connected from the power-grounding element 4 to the upstream side of the selected injector 3-1 or 3-2 in order to circulate the injector-regenerated current generated by, while the injector current 3-1A, 3-2A is supplied, simultaneously de-energizing the upstream driving FET 202 and the battery-side driving FET 212 and energizing the downstream driving FET 1 (220-1) or downstream driving FET 2 (220-2) of the above injector.

In addition, a current-regenerating diode 2-1, 2-2 is connected from the downstream side of the selected injector 3-1, 3-2 to the boost voltage side of the boost circuit 100 so that while the injector current 3-1A, 3-2A is supplied, the upstream driving FET 202, the battery-side driving FET 212, the downstream driving FET 1 (220-1), and the downstream driving FET 2 (220-2) are all de-energized for the boost circuit to regenerate the electrical energy of the injector.

The upstream driving FET 202, the battery-side driving FET 212, the downstream driving FET 1 (220-1), and the downstream driving FET 2 (220-2) have respective driving elements controlled by a gate drive logic circuit 240 that generates a driving signal. The control of each FET is based on: a current supply timing signal applied from the control circuit 300 through a driving circuit-control circuit signal pathway 300B to the driving circuit on the basis of an engine speed and other input parameters from various sensors; and data detected by a boost current detection circuit 241 that detects the boost-side driving current 201A via the boost current detection resistor 201, a battery current detection circuit 242 that detects the battery drive current 211A via the battery current detection resistor 211, and a downstream current detection circuit 243 that detects a downstream driving current 221A via the downstream current detection resistor 221.

As shown in FIG. 8, an upstream driving FET 231 is connected to an upstream side of the second load device 5, and a downstream driving FET 232 and the power-grounding element 4 are connected to a downstream side via a downstream current detection resistor 233 that converts a downstream driving current 233A. A reflux diode 234 for circulating the current regenerated by the second load device 5 by, while a second load device current 5A is supplied, de-energizing the upstream driving FET 231 and energizing the downstream driving FET 232, is connected from the power-grounding element 4 to the upstream side of the second load device 5. Additionally, a current-regenerating diode 6 for causing the boost circuit 100 to regenerate the electrical energy of the second load device 5, generated by, while the second load device current 5A is supplied, de-energizing the upstream driving FET 231 and the downstream driving FET 232, is connected from the downstream side of the second load device 5 to the boost voltage pathway 100A.

In the fifth embodiment, the regenerated current from the second load device 5, as with the regenerated current from the injector, circulates to the boost circuit 100 through the current-regenerating diode 6. In the present embodiment, the upstream driving FET 231 drives the hold deactivation current 470 of the second load device current 5A shown in FIG. 5, and the downstream driving FET 232 can select reduction of the level of the regenerated current from the second load device current 5A slowly via the reflux diode 234 or reduction of the level of the regenerated current within a short time by circulating the current to the boost circuit 100 via the current-regenerating diode 6.

The upstream driving FET 231 and downstream driving FET 232 have respective driving elements controlled by the gate drive logic circuit 240 that generates a driving signal. The control of these FETs is based on: the current supply timing signal applied from the control circuit 300 through the driving circuit-control circuit signal pathway 300B to the driving circuit on the basis of the engine speed and other input parameters from various sensors; and the data detected by a downstream current detection circuit 244 that detects the downstream driving current 233A via the downstream current detection resistor 233.

In internal combustion engine controllers for driving a direct injection type of injector, a solenoid for controlling a high-pressure pump designed to supply a high-pressure fuel to the direct injection type of injector is typically used as a specific example of a second load device 5, but application of the present invention is not limited to the use of such a solenoid.

While embodiments of the present invention have been described above, the invention is not limited to or by the embodiments and can be changed and modified in various forms within the scope of the invention, set forth in the appended claims.

The above fifth embodiment is the same as the second embodiment in that even during the fall period 464 of the peak current and the fall period 465 of the hold current 1, the boost circuit is made to regenerate a current, as in the fall period 466 of the supply current. The fifth embodiment is also the same as the second embodiment in that if the boost voltage 100A stored within the boost capacitor 111 exceeds the required overboost compensation starting voltage 403, the boost voltage can be lowered to the overboost compensation stopping voltage 404 by returning the current from the boost capacitor through the boost coil 101 to the battery power supply.

The present invention relates to internal combustion engine controllers that drive loads using a high voltage obtained by boosting a battery voltage in an automobile, motorcycle, agricultural tractor, machine tool, marine engine, or other machines fueled with gasoline, a light oil, or the like. More particularly, the invention concerns an internal combustion engine controller suitable for driving an in-cylinder direct injection type of injector. In regards to injectors of the in-cylinder direct injection type, the invention drives a device powered from a piezoelectric element and electrically having an inductance component, as well as a device powered from a solenoid and electrically having a capacitor component, and can also be applied to a scheme designed for compensating for an overboost state and regeneratively circulating energy to a boost circuit.

What is claimed is:

1. An internal combustion engine controller, comprising:
a voltage boost circuit for supplying a switching current from a battery power supply voltage to a voltage boost coil and storing, into a voltage boost capacitor through a charging diode, a high voltage generated in the boost coil when a level of the switching current is reduced;
a regenerating circuit for controlling an injector current using the high voltage stored within the boost capacitor and regenerating electrical energy of an injector to said voltage boost circuit when a level of the injector current is reduced; and
a discharge switching element for being provided in parallel to the charging diode;
wherein, if the high voltage stored within said voltage boost circuit exceeds a required overboost compensation starting voltage,
when voltage boost switching is in progress, said regenerating circuit controls that electrical energizing of said discharge switching element is suppressed, and
after the voltage boost switching operation, said regenerating circuit controls that said discharge switching element is energized to discharge the high voltage into the battery power supply through the boost coil.

2. The internal combustion engine controller according to claim 1, further comprising in addition to the injector to be driven using the high voltage stored within the boost capacitor;
a second load device not using the high voltage; and
a circuit for causing said voltage boost circuit to regenerate electrical energy that said load device possesses when a level of a supply current to said load device is reduced.

3. The internal combustion engine controller according to claim 1, further comprising:
a control circuit having an A/D converter, an arithmetic unit and an interface, the A/D converter being adapted to digitize an analog voltage, the arithmetic unit being adapted to operate in accordance with a program stored within a memory, the interface being adapted to output a driving signal between the arithmetic unit and a switching element;
wherein software stored in the memory is used to apply a general-purpose control circuit to voltage boost control and overboost-compensating control.

4. The internal combustion engine controller according to claim 1, wherein:
an FET is used as said discharge switching element; and
a parasitic diode included in said FET is used as a substitute for said charging diode.

5. The internal combustion engine controller according to claim 1, wherein:
a bipolar transistor is used as said discharge switching element.

6. The internal combustion engine controller according to claim 1, wherein:
an IGBT is used as said discharge switching element.

7. An internal combustion engine controller, comprising:
a voltage boost circuit for supplying a switching current from a battery power supply voltage to a voltage boost coil and storing, into a voltage boost capacitor through a charging diode, a high voltage generated in the boost coil when a level of the switching current is reduced;
a regenerating circuit for controlling an injector current using the high voltage stored within the boost capacitor and regenerating electrical energy of an injector to said voltage boost circuit when a level of the injector current is reduced; and
a discharge switching element for being provided in parallel to the charging diode;
wherein:
if the high voltage stored within the boost circuit exceeds a required overboost compensation starting voltage,
when the voltage boost switching operation is in progress, said regenerating circuit controls that electrical energizing of said discharge switching element is suppressed, and
after the voltage boost switching operation, prior to electrical energizing of said discharge switching element, a dead time that allows for a delay time required for said boost switching element to cut off a current is provided and said regenerating circuit controls that said discharge switching element is energized to discharge the current from the boost capacitor to the battery power supply, and
if the high voltage stored within said voltage boost circuit decreases below a required boost starting voltage,
after the electrical energizing of said discharge switching element, prior to a shift to boost operation by electrical energizing of said boost switching element, a dead time that allows for a delay time required for said discharge switching element to cut off a current is provided and said regenerating circuit controls that said boost switching element is energized.

8. The internal combustion engine controller according to claim 7, further comprising in addition to the injector to be driven using the high voltage stored within the boost capacitor;
a second load device not using the high voltage; and
a circuit for causing said voltage boost circuit to regenerate electrical energy that said load device possesses when a level of a supply current to said load device is reduced.

9. The internal combustion engine controller according to claim 7, further comprising:
a control circuit having an A/D converter, an arithmetic unit and an interface, the A/D converter being adapted to digitize an analog voltage, the arithmetic unit being adapted to operate in accordance with a program stored within a memory, the interface being adapted to output a driving signal between the arithmetic unit and a switching element;
wherein software stored in the memory is used to apply a general-purpose control circuit to voltage boost control and overboost-compensating control.

10. The internal combustion engine controller according to claim 7, wherein:
an FET is used as said discharge switching element; and
a parasitic diode included in said FET is used as a substitute for said charging diode.

11. The internal combustion engine controller according to claim 7, wherein:
a bipolar transistor is used as said discharge switching element.

12. The internal combustion engine controller according to claim 7, wherein:
an IGBT is used as said discharge switching element.

13. An internal combustion engine controller, comprising:
a voltage boost circuit for supplying a switching current from a battery power supply voltage to a voltage boost coil and storing, into a voltage boost capacitor through a charging diode, a high voltage generated in the boost coil when a level of the switching current is reduced;
a regenerating circuit for controlling an injector current using the high voltage stored within the boost capacitor and regenerating electrical energy of an injector to said voltage boost circuit when a level of the injector current is reduced; and a discharge switching element for being provided in parallel to the charging diode;

wherein, if the high voltage stored within said voltage boost circuit exceeds a required overboost compensation starting voltage, said regenerating circuit controls that said discharge switching element is electrically energized to discharge the high voltage into the battery power supply through the boost coil.

14. The internal combustion engine controller according to claim 13, wherein:

an FET is used as said discharge switching element; and a parasitic diode included in said FET is used as a substitute for said charging diode.

15. The internal combustion engine controller according to claim 13, wherein:

a bipolar transistor is used as said discharge switching element.

16. The internal combustion engine controller according to claim 13, wherein:

an IGBT is used as said discharge switching element.

17. The internal combustion engine controller according to claim 13, further comprising:

a control circuit having an A/D converter, an arithmetic unit and an interface, the A/D converter being adapted to digitize an analog voltage, the arithmetic unit being adapted to operate in accordance with a program stored within a memory, the interface being adapted to output a driving signal between the arithmetic unit and a switching element;

wherein software stored in the memory is used to apply a general-purpose control circuit to voltage boost control and overboost-compensating control.

18. The internal combustion engine controller according to claim 17, wherein:

an FET is used as said discharge switching element; and a parasitic diode included in said FET is used as a substitute for said charging diode.

19. The internal combustion engine controller according to claim 17, wherein:

a bipolar transistor is used as said discharge switching element.

20. The internal combustion engine controller according to claim 13, further comprising in addition to the injector to be driven using the high voltage stored within the boost capacitor:

a second load device not using the high voltage; and a circuit for causing said voltage boost circuit to regenerate electrical energy that said load device possesses when a level of a supply current to said load device is reduced.

21. The internal combustion engine controller according to claim 20, further comprising:

a control circuit having an A/D converter, an arithmetic unit and an interface, the A/D converter being adapted to digitize an analog voltage, the arithmetic unit being adapted to operate in accordance with a program stored within a memory, the interface being adapted to output a driving signal between the arithmetic unit and a switching element;

wherein software stored in the memory is used to apply a general-purpose control circuit to voltage boost control and overboost-compensating control.

22. The internal combustion engine controller according to claim 20, wherein:

an FET is used as said discharge switching element; and a parasitic diode included in said FET is used as a substitute for said charging diode.

23. The internal combustion engine controller according to claim 20, wherein:

a bipolar transistor is used as said discharge switching element.

24. The internal combustion engine controller according to claim 20, wherein:

an IGBT is used as said discharge switching element.

25. The internal combustion engine controller according to claim 20, wherein:

an IGBT is used as said discharge switching element.

* * * * *